United States Patent
Ji et al.

(10) Patent No.: US 11,640,319 B1
(45) Date of Patent: May 2, 2023

(54) TASK PROCESSING METHOD AND APPARATUS, ELECTRONIC DEVICE AND STORAGE MEDIUM

(71) Applicant: BEIJING BAIDU NETCOM SCIENCE TECHNOLOGY CO., LTD., Beijing (CN)

(72) Inventors: Gang Ji, Beijing (CN); Chao Tian, Beijing (CN); Lei Jia, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/945,166

(22) Filed: Sep. 15, 2022

(30) Foreign Application Priority Data

Nov. 26, 2021 (CN) .......................... 202111421470.1

(51) Int. Cl.
*G06F 9/48* (2006.01)
*G06F 12/0802* (2016.01)
*G06F 9/50* (2006.01)

(52) U.S. Cl.
CPC .......... *G06F 9/4881* (2013.01); *G06F 9/5038* (2013.01); *G06F 12/0802* (2013.01)

(58) Field of Classification Search
None
See application file for complete search history.

(56) References Cited

U.S. PATENT DOCUMENTS

| 6,442,758 B1 * | 8/2002 | Jang | ....................... H04N 7/142 348/E7.079 |
| 7,782,328 B1 * | 8/2010 | Li | ......................... G06F 13/362 345/522 |
| 8,966,487 B1 | 2/2015 | Leonard | |

(Continued)

FOREIGN PATENT DOCUMENTS

| CN | 106326066 A | 1/2017 |
| CN | 108073446 A | 5/2018 |

(Continued)

OTHER PUBLICATIONS

Bo Zhao, Shengzhao Ye, Chong Wang, Senjie Lin, "A Timeout Threshold Estimation Algorithm Based on Equivalent Proportional Execution Time", Aug. 30-Sep. 2, 2018, pp. 1-5, National Digital Switching System Engineering & Technological R&D Center NDSC, Zhengzhou, China.

(Continued)

*Primary Examiner* — Hyun Nam
(74) *Attorney, Agent, or Firm* — Brooks Kushman P.C.

(57) ABSTRACT

A task processing method, an electronic device and a storage medium, which relate to the field of artificial intelligence, such as intelligent voices, artificial intelligence chips, or the like, are disclosed. The method may include: for to-be-executed tasks, in at least one round of processing, performing the following operations: in response to determining that one or more high-priority tasks exist in the to-be-executed tasks, calling the one or more high-priority tasks to process audio data cached in a memory; and after execution of the (Continued)

one or more high-priority tasks is completed, and in response to determining that one or more low-priority task exist in the to-be-executed tasks, calling the one or more low-priority tasks to process the audio data.

15 Claims, 4 Drawing Sheets

(56) References Cited

U.S. PATENT DOCUMENTS

| | | | |
|---|---|---|---|
| 11,575,758 B1* | 2/2023 | Thakare | H04L 67/141 |
| 2003/0037091 A1 | 2/2003 | Nishimura et al. | |
| 2003/0167294 A1* | 9/2003 | Neuman | G06F 9/4881 |
| | | | 718/102 |
| 2008/0014956 A1* | 1/2008 | Balasubramanian | |
| | | | H04L 41/0253 |
| | | | 455/452.1 |
| 2010/0296466 A1* | 11/2010 | Mignot | H04L 47/25 |
| | | | 370/329 |
| 2012/0259440 A1* | 10/2012 | Zhang | G06F 9/4881 |
| | | | 700/94 |
| 2013/0074088 A1 | 3/2013 | Purcell et al. | |
| 2015/0089495 A1* | 3/2015 | Persson | G06F 9/45558 |
| | | | 718/1 |
| 2018/0015936 A1* | 1/2018 | Wang | G05B 15/02 |
| 2022/0383870 A1* | 12/2022 | Hsu | G10L 15/32 |
| 2022/0413585 A1* | 12/2022 | Iyer | G06F 1/3231 |
| 2023/0044624 A1* | 2/2023 | Iyer | H04N 23/80 |

FOREIGN PATENT DOCUMENTS

| | | |
|---|---|---|
| CN | 108255589 A | 7/2018 |
| CN | 110312156 A | 10/2019 |
| CN | 110489217 A | 11/2019 |
| CN | 110928827 A | 3/2020 |
| CN | 112650465 A | 4/2021 |
| EP | 1286264 A2 | 2/2003 |
| WO | 2019237593 A1 | 12/2019 |

OTHER PUBLICATIONS

Wang Xueshun, Yu Shaohua, Xu Ning, Dai Jinyou, Abstract of "Dynamic Threshold Scheduling Algorithm for Streaming Media Transmission", Computer Research and Development, vol. 1, Jan. 15, 2011.

Nie Delei, Zhao Bo, Wang Chong, Wang Xin, Yan Binghao, "Timeout Threshold Estimation Algorithm in Mimic Multiple Executors Architecture", Oct. 15, 2018, pp. 1-9, vol. 4, Issue No. 10, Chinese Journal of Network and Information Security.

Extended European Search Report of European application No. 221955005.7 dated Mar. 15, 2023, 10 pages.

* cited by examiner

TASK PROCESSING METHOD AND APPARATUS, ELECTRONIC DEVICE AND STORAGE MEDIUM

CROSS-REFERENCE TO RELATED APPLICATIONS

The present disclosure claims the priority and benefit of Chinese Patent Application No. 202111421470.1, filed on Nov. 26, 2021, entitled "TASK PROCESSING METHOD AND APPARATUS, ELECTRONIC DEVICE AND STORAGE MEDIUM." The disclosure of the above application is incorporated herein by reference in its entirety.

TECHNICAL FIELD

The present disclosure relates to the field of artificial intelligence technologies, and particularly to the fields of intelligent voices, artificial intelligence chips, or the like, and more particularly to a task processing method and apparatus, an electronic device and a storage medium.

BACKGROUND

In a conventional digital signal processing (DSP) voice chip, usually, a free embedded real-time operation system (FreeRTOS) is used as an operation system, i.e., a voice system.

However, since multi-task scheduling is realized by a FreeRTOS mechanism, a system is required to have at least one timer, and dump protection is required to be performed on task context during task switching; and since the task context is required to be frequently called in and out during task switching, system overhead, or the like, is increased.

SUMMARY

The present disclosure provides a task processing method, an electronic device and a storage medium.

A task processing method, includes for to-be-executed tasks, in at least one round of processing, performing the following operations in response to determining that one or more high-priority tasks exist in the to-be-executed tasks, calling the one or more high-priority tasks to process audio data cached in a memory; and after execution of the one or more high-priority tasks is completed, and in response to determining that one or more low-priority tasks exist in the to-be-executed tasks, calling the one or more low-priority tasks to process the audio data.

An electronic device includes at least one processor; and a memory connected with the at least one processor communicatively; wherein the memory stores instructions executable by the at least one processor to enable the at least one processor to perform the method as mentioned above.

There is provided a non-transitory computer readable storage medium with computer instructions stored thereon, wherein the computer instructions are used for causing a computer to perform the method as mentioned above.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF THE DRAWINGS

The drawings are used for better understanding the present solution and do not constitute a limitation of the present disclosure. In the drawings.

DETAILED DESCRIPTION

The following part will illustrate exemplary embodiments of the present disclosure with reference to the drawings, including various details of the embodiments of the present disclosure for a better understanding. The embodiments should be regarded only as exemplary ones. Therefore, those skilled in the art should appreciate that various changes or modifications can be made with respect to the embodiments described herein without departing from the scope and spirit of the present disclosure. Similarly, for clarity and conciseness, the descriptions of the known functions and structures are omitted in the descriptions below.

In addition, it should be understood that the term "and/or" only describes an association relationship between associated objects, and indicates that three relationships may exist. For example, A and/or B may indicate three cases: only A exists; both A and B exist; and only B exists. In addition, in this specification, the symbol "/" generally indicates that associated objects have a relationship of "or".

Figure 1:
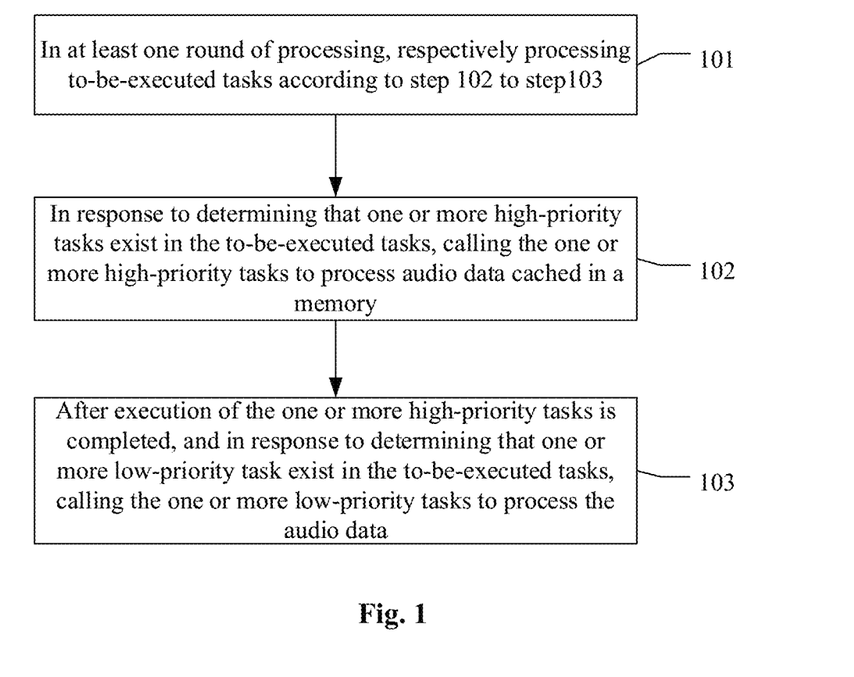
FIG. 1 is a flow chart of a task processing method according to an embodiment of the present disclosure.

FIG. 1 is a flow chart of a task processing method according to an embodiment of the present disclosure. As shown in FIG. 1, the method includes the following implementation steps:

step 101: in at least one round of processing, respectively processing to-be-executed tasks according to step 102 to step 103.

step 102: in response to determining that one or more high-priority tasks exist in the to-be-executed tasks, calling the high-priority task to process audio data cached in a memory; and step 103: after execution of the one or more high-priority tasks is completed, and in response to determining that one or more low-priority tasks exist in the to-be-executed tasks, calling the low-priority task to process the audio data.

It may be seen that, in the solution of the above method embodiment, the high-priority task(s) and the low-priority task(s) in the to-be-executed tasks may be called respectively, and the audio data cached in the memory may be processed when each task is called; compared with a traditional method, task context is not required to be called in and out, thereby reducing system overhead, and guaranteeing timely processing of the high-priority task, or the like.

Preferably, an execution subject of the embodiment shown in FIG. 1 may be a voice system.

In one embodiment of the present disclosure, the memory may be a pre-allocated memory, such as a manually pre-allocated memory. In consideration of simplification of hardware design, miniaturization of software management codes, or the like, in the solution of the present disclosure, a static memory allocation method may be adopted; that is, a memory required by the voice system is pre-allocated, and is reserved in an initialization stage, application (malloc) and freeing (free) are not required in a program running process, the voice system provides a memory application function (bd_os_malloc) and a memory freeing function (bd_os_free), and only whether the pre-allocated memory is occupied is required to be marked during an actual operation.

In addition, in one embodiment of the present disclosure, audio data frames may be cached in the memory with a loop caching method in an arrival time order.

Figure 2:
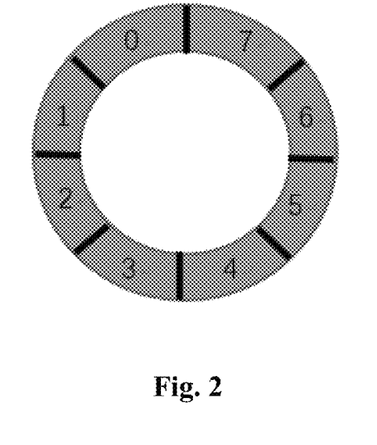
FIG. 2 is a schematic diagram of a loop caching method in the present disclosure.

FIG. 2 is a schematic diagram of the loop caching method in the present disclosure. The memory of the voice system is mainly used for caching the audio data, or the like, and may be accessed with the loop caching method. As shown in FIG. 2, assuming that 8 audio data frames are cached at most, by configuration, the audio data may be automatically transferred by direct memory access (DMA) in a DSP voice chip to the memory, and is uniformly scheduled and managed by the voice system. As shown in FIG. 2, in the arrival time order, firstly, a zeroth audio data frame is stored at a zeroth memory location segment, and then, sequentially, a first audio data frame is stored at a first memory location segment, a second audio data frame is stored at a second memory location segment, a third audio data frame is stored at a third memory location segment, a fourth audio data frame is stored at a fourth memory location segment, a fifth audio data frame is stored at a fifth memory location segment, a sixth audio data frame is stored at a sixth memory location segment, a seventh audio data frame is stored at a seventh memory location segment, and an eighth audio data frame may be automatically rewound at the zeroth memory location segment when arriving; and the process is repeated.

The tasks in the present disclosure may be understood as algorithm modules, such as a wake-up recognition algorithm module, or the like, and correspondingly, calling of different tasks refers to calling of different algorithm modules, and the audio data cached in the memory is processed by the called algorithm modules; for example, corresponding algorithm operations are performed. In addition, the tasks may include one or more high-priority tasks and one or more low-priority tasks; usually, the high-priority tasks refer to tasks required to be processed in real time, such as an audio filter function, and the low-priority tasks have relatively-low requirements on real-time performance.

For the to-be-executed tasks, in any round of processing, if one or more high-priority tasks are determined to exist in the to-be-executed tasks, the high-priority tasks may be called sequentially, and after execution of the high-priority tasks is completed, and if one or more low-priority tasks are determined to exist in the to-be-executed tasks, the low-priority tasks may be called sequentially, and the called to-be-executed tasks process the audio data cached in the memory. Usually, the to-be-executed tasks may include both one or more high-priority tasks and one or more low-priority tasks.

In one embodiment of the present disclosure, the high-priority tasks may be sequentially called with a round robin scheduling algorithm, and the low-priority tasks may be sequentially called with the round robin scheduling algorithm. The algorithm may be quite simply implemented, such that round robin of each task may be completed efficiently.

In one embodiment of the present disclosure, in an execution process of any to-be-executed task, consumed time of the to-be-executed task may also be recorded in real time, and when the consumed time is determined to reach a timeout threshold corresponding to the to-be-executed task, the to-be-executed task is exited, and then, the next to-be-executed task may be called.

In one embodiment of the present disclosure, both the consumed time and the timeout threshold are in a tick count form of the system.

In the solution of the present disclosure, a timer required by a common operation system is not required, and time is recorded with a frame number of the audio data. For example, assuming that one-second audio data is cached, and duration of each audio data frame is 10 milliseconds (ms), the tick count per second is increased by 100. Since the timer is avoided, the system overhead, or the like, is further reduced.

Usually, 32 bits are used for the tick count; for example, the duration of each audio data frame is 10 ms, and a count time may be up to $2^{31} \times 10$ ms=4,294,967,296 ms=about 497 days; that is, the program may run for 497 days without shutdown, and the count may not overflow; since it is quite rare that a voice product runs for one year without shutdown, the counting solution of the present disclosure is feasible.

In one embodiment of the present disclosure, central processing unit (CPU) usage ratios of the to-be-executed tasks may be determined in advance respectively, the sum of the CPU usage ratios of the to-be-executed tasks may be 100%, and correspondingly, for any to-be-executed task, the timeout threshold corresponding to the to-be-executed task may be determined according to the CPU usage ratio of the to-be-executed task and a caching threshold, and the caching threshold is maximum cached audio data duration.

For example, according to complexity of an algorithm completed by each to-be-executed task, an average time required for each to-be-executed task to complete one round, i.e., a number of cycles of a CPU, may be evaluated; and then, the CPU usage ratio, i.e., a CPU occupancy rate, of each to-be-executed task may be allocated according to a main frequency of the system.

Figure 3:
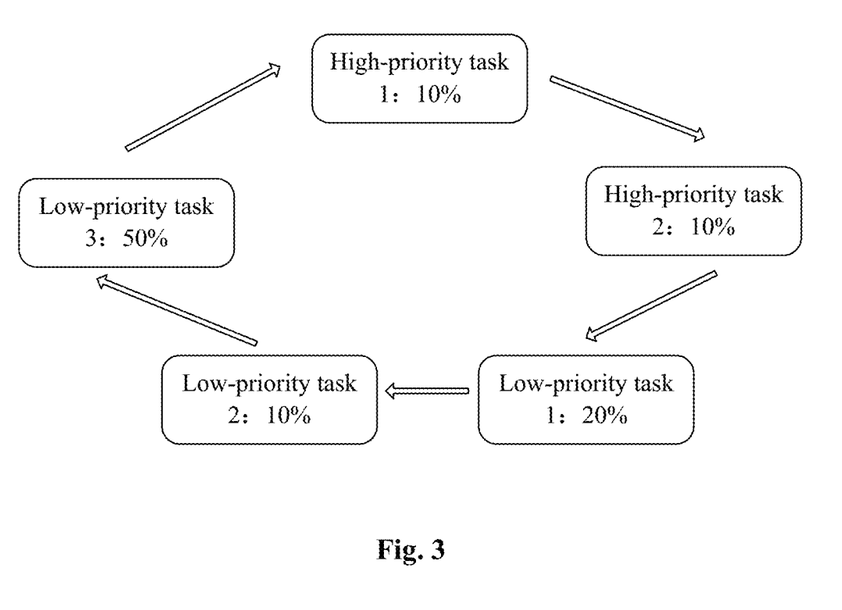
FIG. 3 is a schematic diagram of CPU usage ratios of to-be-executed tasks in the present disclosure.

FIG. 3 is a schematic diagram of the CPU usage ratios of the to-be-executed tasks in the present disclosure. As shown in FIG. 3, it is assumed that there exist 5 to-be-executed tasks which are high-priority task 1, high-priority task 2, low-priority task 1, low-priority task 2, and low-priority task 3 respectively, the CPU usage ratio of the high-priority task 1 is 10%, the CPU usage ratio of the high-priority task 2 is 10%, the CPU usage ratio of the low-priority task 1 is 20%, the CPU usage ratio of the low-priority task 2 is 10%, and the CPU usage ratio of the low-priority task 3 is 50%.

Assuming that one-second audio data is cached, and the duration of each audio data frame is 10 ms, the tick count per second is increased by 100; taking the high-priority task 1 shown in FIG. 3 as an example, the CPU usage ratio 10% may be converted into the tick count of 100×10%=10, and correspondingly, the timeout threshold corresponding to the high-priority task 1 may be 10; similarly, the timeout threshold corresponding to the high-priority task 2 may be 10, the timeout threshold corresponding to the low-priority task 1 may be 20, the timeout threshold corresponding to the low-priority task 2 may be 10, and the timeout threshold corresponding to the low-priority task 3 may be 50.

With the above processing operation, the timeout thresholds corresponding to different to-be-executed tasks may be accurately and efficiently determined, such that a good foundation is laid for subsequent processing operations.

Taking the to-be-executed tasks shown in FIG. 3 as an example, in an execution process of the high-priority task 1, the consumed time of the high-priority task 1 may be recorded in real time, and when the consumed time is determined to reach the corresponding timeout threshold 10, the high-priority task 1 may be exited; that is, the high-priority task 1 is exited to give up the use right of the CPU, and the next to-be-executed task, such as the high-priority task 2, may be called; similarly, in an execution process of the high-priority task 2, the consumed time of the high-priority task 2 may be recorded in real time, and when the consumed time is determined to reach the corresponding timeout threshold 10, the high-priority task 2 may be exited, and the next to-be-executed task, such as the low-priority task 1, may be called; in an execution process of the low-priority task 1, the consumed time of the low-priority task 1 may be recorded in real time, and when the consumed time is determined to reach the corresponding timeout threshold 20, the low-priority task 1 may be exited, and the next to-be-executed task, such as the low-priority task 2, may be called; and the rest can be done in the same manner.

The above processing operation may realize reasonable utilization of a CPU resource, thus increasing a utilization rate of the CPU resource, or the like.

In the solution of the present disclosure, the consumed time of the currently-executed to-be-executed task may be recorded in real time, and total consumed time corresponding to the to-be-executed tasks in one round may also be recorded in real time, such that before any to-be-executed task is executed, whether the current total consumed time is higher than a system threshold, for example, 100, may be determined firstly, and if yes, a problem may be considered to occur, for example, a frame missing problem, or the like, thereby performing error reporting processing, or the like; if no, the to-be-executed task may be executed normally, the consumed time of the to-be-executed task may be recorded in real time, and when the consumed time is determined to reach the timeout threshold corresponding to the to-be-executed task, the to-be-executed task may be exited.

In one embodiment of the present disclosure, when a predetermined trigger condition is met, the caching threshold may also be increased. The predetermined trigger condition is not limited, and may be determined according to actual requirements.

The above-mentioned methods of determining the CPU usage ratios of the to-be-executed tasks and setting the timeout thresholds are implementations in an ideal state, and in practical applications, due to uneven computing power of the to-be-executed tasks, or the like, the CPU usage ratio may not be distributed according to the ideal state, and each to-be-executed task may have some margins, thereby possibly causing the frame missing problem, or the like; for example, one audio data frame is overwritten before processed by one/some to-be-executed tasks, and correspondingly, the predetermined trigger condition may be considered to be met, thereby increasing the caching threshold.

For example, the one-second audio data is cached originally, and 1.28-second audio data is cached after the increase; and assuming that the duration of each audio data frame is 10 ms, 128 audio data frames may be cached, thereby ensuring that the audio data frame is not missed due to timely processing as far as possible.

In one embodiment of the present disclosure, the CPU usage ratio of at least one to-be-executed task may also be adjusted according to a predetermined strategy, and the corresponding timeout threshold may be adjusted according to the adjusted CPU usage ratio. The predetermined strategy is not limited, and may be determined according to actual requirements.

For example, in order to solve the frame missing problem, the timeout threshold corresponding to one or some to-be-executed tasks may be adjusted; for example, the timeout threshold corresponding to the high-priority task 1 is adjusted from 10 to 8, such that the high-priority task 1 may be exited in advance, thus avoiding that the other to-be-executed tasks may not be executed due to starvation, and maintaining normal running of the system.

For another example, the CPU usage ratios of the high-priority tasks and the low-priority tasks may be adjusted integrally, and the CPU usage ratios of the to-be-executed tasks having the same priority may be adjusted correspondingly; when the CPU usage ratio is changed, the corresponding timeout threshold is changed; additionally, for each to-be-executed task, the timeout threshold corresponding to each round may be dynamically determined, and with adjustment, the CPU resource may be maximally used, thus increasing the utilization rate of the CPU resource.

It should be noted that for simplicity of description, the above-mentioned embodiment of the method is described as combinations of a series of acts, but those skilled in the art should understand that the present disclosure is not limited by the described order of acts, as some steps may be performed in other orders or simultaneously according to the present disclosure. Further, those skilled in the art should also understand that the embodiments described in this specification are preferred embodiments and that acts and modules referred to are not necessary for the present disclosure.

The above is a description of an embodiment of the method, and an embodiment of an apparatus according to the present disclosure will be further described below.

Figure 4:
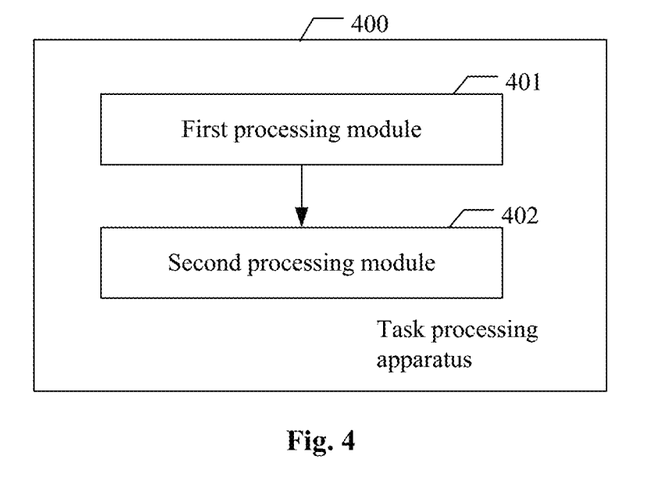
FIG. 4 is a schematic structural diagram of a task processing apparatus 400 according to a first embodiment of the present disclosure.

FIG. 4 is a schematic structural diagram of a task processing apparatus 400 according to a first embodiment of the present disclosure. As shown in FIG. 4, the task processing apparatus includes a first processing module 401 configured to, for to-be-executed tasks, in at least one round of processing, in response to determining that one or more high-priority tasks exist in the to-be-executed tasks, call the one or more high-priority tasks to process audio data cached in a memory; and a second processing module 402 configured to, after execution of the one or more high-priority tasks is completed, and in response to determining that one or more low-priority tasks exist in the to-be-executed tasks, call the one or more low-priority tasks to process the audio data.

In the solution of the above apparatus embodiment, the high-priority task(s) and the low-priority task(s) in the to-be-executed tasks may be called respectively, and the audio data cached in the memory may be processed when each task is called; compared with a traditional method, task context is not required to be called in and out, thereby reducing system overhead, and guaranteeing timely processing of the high-priority task, or the like.

In one embodiment of the present disclosure, the memory may be a pre-allocated memory, such as a manually pre-allocated memory; in addition, audio data frames may be cached in the memory with a loop caching method in an arrival time order.

The tasks in the present disclosure may be understood as algorithm modules, such as a wake-up recognition algorithm module, or the like. In addition, the tasks may include one or more high-priority tasks and one or more low-priority tasks; usually, the high-priority tasks refers to tasks required to be processed in real time and the low-priority tasks have relatively-low requirements on real-time performance.

For the to-be-executed tasks, in any round of processing, if the high-priority tasks are determined to exist in the to-be-executed tasks, the first processing module 401 may call the high-priority tasks sequentially, and after execution of the high-priority tasks is determined to be completed, if the low-priority tasks are determined to exist in the to-be-executed tasks, the second processing module 402 may call the low-priority tasks sequentially, and the called to-be-executed tasks process the audio data cached in the memory. Usually, the to-be-executed tasks may include both one or more high-priority tasks and one or more low-priority tasks.

In one embodiment of the present disclosure, the first processing module 401 may sequentially call the high-priority tasks with a round robin scheduling algorithm, and the second processing module 402 may sequentially call the low-priority tasks with the round robin scheduling algorithm.

In one embodiment of the present disclosure, the first processing module 401 and the second processing module 402 may also, in an execution process of any to-be-executed task, record consumed time of the to-be-executed task in real time, and exit the to-be-executed task when the consumed time reaches a timeout threshold corresponding to the to-be-executed task.

In one embodiment of the present disclosure, both the consumed time and the timeout threshold may be in a tick count form.

Figure 5:
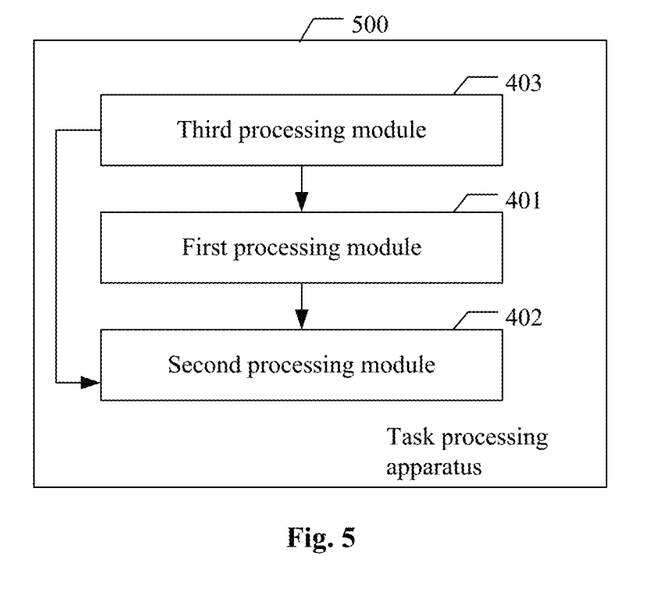
FIG. 5 is a schematic structural diagram of a task processing apparatus 500 according to a second embodiment of the present disclosure.

FIG. 5 is a schematic structural diagram of a task processing apparatus 500 according to a second embodiment of the present disclosure. As shown in FIG. 5, the apparatus includes: a first processing module 401, a second processing module 402 and a third processing module 403.

The first processing module 401 and the second processing module 402 are the same as those in the embodiment shown in FIG. 4, and not repeated.

The third processing module 403 is configured to: determine CPU usage ratios of the to-be-executed tasks respectively, the sum of the CPU usage ratios of the to-be-executed tasks being 100%; and correspondingly, for any to-be-executed task, determine the timeout threshold corresponding to the to-be-executed task according to the CPU usage ratio of the to-be-executed task and a caching threshold, the caching threshold being maximum cached audio data duration.

In one embodiment of the present disclosure, when a predetermined trigger condition is met, the third processing module 403 may increase the caching threshold.

In addition, in one embodiment of the present disclosure, the third processing module 403 may further adjust the CPU usage ratio of at least one to-be-executed task according to a predetermined strategy, and adjust the corresponding timeout threshold according to the adjusted CPU usage ratio.

For the specific work flows of the embodiments of the apparatus shown in FIGS. 4 and 5, reference may be made to the related description in the foregoing embodiment of the method.

In a word, with the technical solution of the present disclosure, system overhead may be reduced and utilization rate of the CPU and memory resources may be increased, and correspondingly, the DSP voice chip with the voice system in the present disclosure may meet requirements of a voice algorithm only by adopting a smaller memory and a CPU with a lower main frequency.

The technical solution of the present disclosure may be applied to the field of artificial intelligence, and particularly relates to the fields of intelligent voices, artificial intelligence chips, or the like. Artificial intelligence is a subject of researching how to cause a computer to simulate certain thought processes and intelligent behaviors (for example, learning, inferring, thinking, planning, or the like) of a human, and includes both hardware-level technologies and software-level technologies. Generally, the hardware technologies of the artificial intelligence include technologies, such as a sensor, a dedicated artificial intelligence chip, cloud computing, distributed storage, big data processing, or the like; the software technologies of the artificial intelligence mainly include a computer vision technology, a voice recognition technology, a natural language processing technology, a machine learning/deep learning technology, a big data processing technology, a knowledge graph technology, or the like.

In addition, in the technical solution of the present disclosure, the collection, storage, usage, processing, transmission, provision, disclosure, or the like, of involved user personal information are in compliance with relevant laws and regulations, and do not violate public order and good customs.

According to the embodiment of the present disclosure, there are also provided an electronic device, a readable storage medium and a computer program product.

Figure 6:
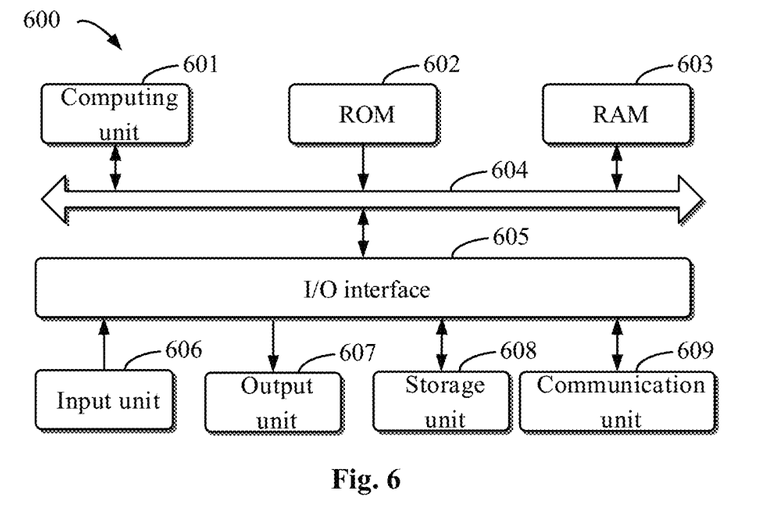
FIG. 6 shows a schematic block diagram of an electronic device 600 which may be configured to implement the embodiment of the present disclosure.

FIG. 6 shows a schematic block diagram of an electronic device 600 which may be configured to implement the embodiment of the present disclosure. The electronic device is intended to represent various forms of digital computers, such as laptop computers, desktop computers, workstations, servers, blade servers, mainframe computers, and other appropriate computers. The electronic device may also represent various forms of mobile apparatuses, such as personal digital assistants, cellular telephones, smart phones, wearable devices, and other similar computing apparatuses. The components shown herein, their connections and relationships, and their functions, are meant to be exemplary only, and are not meant to limit implementation of the present disclosure described and/or claimed herein.

As shown in FIG. 6, the device 600 includes a computing unit 601 which may perform various appropriate actions and processing operations according to a computer program stored in a read only memory (ROM) 602 or a computer program loaded from a storage unit 608 into a random access memory (RAM) 603. Various programs and data necessary for the operation of the device 600 may be also stored in the RAM 603. The computing unit 601, the ROM 602, and the RAM 603 are connected with one other through a bus 604. An input/output (I/O) interface 605 is also connected to the bus 604.

The plural components in the device 600 are connected to the I/O interface 605, and include: an input unit 606, such as a keyboard, a mouse, or the like; an output unit 607, such as various types of displays, speakers, or the like; the storage unit 608, such as a magnetic disk, an optical disk, or the like; and a communication unit 609, such as a network card, a modem, a wireless communication transceiver, or the like. The communication unit 609 allows the device 600 to exchange information/data with other devices through a computer network, such as the Internet, and/or various telecommunication networks.

The computing unit 601 may be a variety of general and/or special purpose processing components with processing and computing capabilities. Some examples of the computing unit 601 include, but are not limited to, a central processing unit (CPU), a graphic processing unit (GPU), various dedicated artificial intelligence (AI) computing chips, various computing units running machine learning model algorithms, a digital signal processor (DSP), and any suitable processor, controller, microcontroller, or the like. The computing unit 601 performs the methods and processing operations described above, such as the method according to the present disclosure. For example, in some embodiments, the method according to the present disclosure may be implemented as a computer software program tangibly contained in a machine readable medium, such as the storage unit 608. In some embodiments, part or all of the computer program may be loaded and/or installed into the device 600 via the ROM 602 and/or the communication unit 609. When the computer program is loaded into the RAM 603 and executed by the computing unit 601, one or more steps of the method according to the present disclosure may be performed. Alternatively, in other embodiments, the computing unit 601 may be configured to perform the method according to the present disclosure by any other suitable means (for example, by means of firmware).

Various implementations of the systems and technologies described herein above may be implemented in digital electronic circuitry, integrated circuitry, field programmable gate arrays (FPGA), application specific integrated circuits (ASIC), application specific standard products (ASSP), systems on chips (SOC), complex programmable logic devices (CPLD), computer hardware, firmware, software, and/or combinations thereof. The systems and technologies may be implemented in one or more computer programs which are executable and/or interpretable on a programmable system including at least one programmable processor, and the programmable processor may be special or general, and may receive data and instructions from, and transmit data and instructions to, a storage system, at least one input apparatus, and at least one output apparatus.

Program codes for implementing the method according to the present disclosure may be written in any combination of one or more programming languages. These program codes may be provided to a processor or a controller of a general purpose computer, a special purpose computer, or other programmable data processing apparatuses, such that the program code, when executed by the processor or the controller, causes functions/operations specified in the flowchart and/or the block diagram to be implemented. The program code may be executed entirely on a machine, partly on a machine, partly on a machine as a stand-alone software package and partly on a remote machine, or entirely on a remote machine or a server.

In the context of the present disclosure, the machine readable medium may be a tangible medium which may contain or store a program for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the foregoing.

To provide interaction with a user, the systems and technologies described here may be implemented on a computer having: a display apparatus (for example, a cathode ray tube (CRT) or liquid crystal display (LCD) monitor) for displaying information to a user; and a keyboard and a pointing apparatus (for example, a mouse or a trackball) by which a user may provide input for the computer. Other kinds of apparatuses may also be used to provide interaction with a user; for example, feedback provided for a user may be any form of sensory feedback (for example, visual feedback, auditory feedback, or tactile feedback); and input from a user may be received in any form (including acoustic, speech or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which run on respective computers and have a client-server relationship to each other. The server may be a cloud server or a server of a distributed system, or a server incorporating a blockchain.

It should be understood that various forms of the flows shown above may be used and reordered, and steps may be added or deleted. For example, the steps described in the present disclosure may be executed in parallel, sequentially, or in different orders, which is not limited herein as long as the desired results of the technical solution disclosed in the present disclosure may be achieved.

The above-mentioned implementations are not intended to limit the scope of the present disclosure. It should be understood by those skilled in the art that various modifications, combinations, sub-combinations and substitutions may be made, depending on design requirements and other factors. Any modification, equivalent substitution and improvement made within the spirit and principle of the present disclosure all should be included in the extent of protection of the present disclosure.

What is claimed is:

1. A task processing method, comprising:
    for to-be-executed tasks, in at least one round of processing, performing the following operations:
    in response to determining that one or more high-priority tasks exist in the to-be-executed tasks, calling the one or more high-priority tasks to process audio data cached in a memory; and
    after execution of the one or more high-priority tasks is completed, and in response to determining that one or more low-priority task exist in the to-be-executed tasks, calling the one or more low-priority tasks to process the audio data;
    wherein the method further comprises:
    determining central processing unit (CPU) usage ratios of the to-be-executed tasks respectively, the sum of the CPU usage ratios of the to-be-executed tasks being 100%, comprising: according to complexity of an algorithm completed by each to-be-executed task, evaluating an average time required for each to-be-executed task to complete one round, and determining the CPU usage ratio of each to-be-executed task according to a main frequency of the system and the A average time; for any to-be-executed task, determining a timeout threshold corresponding to the to-be-executed task according to the CPU usage ratio of the to-be-executed task and a caching threshold, the caching threshold being maximum cached audio data duration, before executing any to-be-executed task, determining whether current total consumed time is higher than a system threshold, if the current total consumed time is higher than the system threshold, performing error reporting processing, and if the current total consumed time is not higher than the system threshold, executing the to-be-executed task, and in an execution process of any to-be-executed task, recording consumed time of the to-be-executed task in real time; and exiting the to-be-executed task when the consumed time reaches the timeout threshold corresponding to the to-be-executed task.

2. The method according to claim 1,
wherein the calling the one or more high-priority tasks comprises: sequentially calling the high-priority tasks with a round robin scheduling algorithm; and
wherein the calling the one or more low-priority tasks comprises: sequentially calling the low-priority tasks with the round robin scheduling algorithm.

3. The method according to claim 1,
wherein the memory is a pre-allocated memory; and
wherein the audio data cached in the memory comprises: audio data frames cached in the memory with a loop caching method in an arrival time order.

4. The method according to claim 1, wherein both the consumed time and the timeout threshold are in a tick count form of a system.

5. The method according to claim 1, further comprising: increasing the caching threshold when a predetermined trigger condition is met.

6. The method according to claim 1, further comprising: adjusting the CPU usage ratio of at least one to-be-executed task according to a predetermined strategy, and adjusting the corresponding timeout threshold according to the adjusted CPU usage ratio.

7. An electronic device, comprising:
at least one processor; and
a memory connected with the at least one processor communicatively;
wherein the memory stores instructions executable by the at least one processor to enable the at least one processor to perform a task processing method comprising:
for to-be-executed tasks, in at least one round of processing, performing the following operations:
in response to determining that one or more high-priority tasks exist in the to-be-executed tasks, calling the one or more high-priority tasks to process audio data cached in a memory; and
after execution of the one or more high-priority tasks is completed, and in response to determining that one or more low-priority task exist in the to-be-executed tasks, calling the one or more low-priority tasks to process the audio data;
wherein the method further comprises:
determining central processing unit (CPU) usage ratios of the to-be-executed tasks respectively, the sum of the CPU usage ratios of the to-be-executed tasks being 100%, comprising: according to complexity of an algorithm completed by each to-be-executed task, evaluating an average time required for each to-be-executed task to complete one round, and determining the CPU usage ratio of each to-be-executed task according to a main frequency of the system and the average time; for any to-be-executed task, determining a timeout threshold corresponding to the to-be-executed task according to the CPU usage ratio of the to-be-executed task and a caching threshold, the caching threshold being maximum cached audio data duration, before executing any to-be-executed task, determining whether current total consumed time is higher than a system threshold, if the current total consumed time is higher than the system threshold, performing error reporting processing, and if the current total consumed time is not higher than the system threshold, executing the to-be-executed task, and in an execution process of any to-be-executed task, recording consumed time of the to-be-executed task in real time; and exiting the to-be-executed task when the consumed time reaches the timeout threshold corresponding to the to-be-executed task.

8. The electronic device according to claim 7,
wherein the calling the one or more high-priority tasks comprises: sequentially calling the high-priority tasks with a round robin scheduling algorithm; and
wherein the calling the one or more low-priority tasks comprises: sequentially calling the low-priority tasks with the round robin scheduling algorithm.

9. The electronic device according to claim 7,
wherein the memory is a pre-allocated memory; and
wherein the audio data cached in the memory comprises: audio data frames cached in the memory with a loop caching method in an arrival time order.

10. The electronic device according to claim 7, wherein both the consumed time and the timeout threshold are in a tick count form of a system.

11. The electronic device according to claim 7, wherein the method further comprises:
increasing the caching threshold when a predetermined trigger condition is met.

12. The electronic device according to claim 7, wherein the method further comprises:
adjusting the CPU usage ratio of at least one to-be-executed task according to a predetermined strategy, and adjusting the corresponding timeout threshold according to the adjusted CPU usage ratio.

13. A non-transitory computer readable storage medium storing computer instructions for causing a computer to perform a task processing method comprising:
for to-be-executed tasks, in at least one round of processing, performing the following operations:
in response to determining that one or more high-priority tasks exist in the to-be-executed tasks, calling the one or more high-priority tasks to process audio data cached in a memory; and
after execution of the one or more high-priority tasks is completed, and in response to determining that one or more low-priority task exist in the to-be-executed tasks, calling the one or more low-priority tasks to process the audio data;
wherein the method further comprises:
determining central processing unit (CPU) usage ratios of the to-be-executed tasks respectively, the sum of the CPU usage ratios of the to-be-executed tasks being 100%, comprising: according to complexity of an algorithm completed by each to-be-executed task, evaluating an average time required for each to-be-executed task to complete one round, and determining the CPU usage ratio of each to-be-executed task according to a main frequency of the system and the average time; for any to-be-executed task, determining a timeout threshold corresponding to the to-be-executed task according to the CPU usage ratio of the to-be-executed task and a caching threshold, the caching threshold being maximum cached audio data duration, before executing any to-be-executed task, determining whether current total consumed time is higher than a system threshold, if the current total consumed time is higher than the system threshold, performing error reporting processing, and if the current total consumed time is not higher than the system threshold, executing the to-be-executed task, and in an execution process of any to-be-executed task, recording consumed time of the to-be-executed task in real time; and exiting the to-be-executed task when the consumed time reaches the timeout threshold corresponding to the to-be-executed task.

14. The non-transitory computer readable storage medium according to claim 13, wherein the calling the one or more high-priority tasks comprises: sequentially calling the high-priority tasks with a round robin scheduling algorithm; and wherein the calling the one or more low-priority tasks comprises: sequentially calling the low-priority tasks with the round robin scheduling algorithm.

15. The non-transitory computer readable storage medium according to claim 13, wherein the memory is a pre-allocated memory; and wherein the audio data cached in the memory comprises: audio data frames cached in the memory with a loop caching method in an arrival time order.

\* \* \* \* \*